United States Patent
Wiebe

[11] Patent Number: 6,070,917
[45] Date of Patent: Jun. 6, 2000

[54] SWIVEL COUPLING FOR HIGH PRESSURE FLUID

[76] Inventor: Jacob R. Wiebe, 60 Heaton Avenue, Winnipeg Manitoba, Canada, R3B 3E3

[21] Appl. No.: 09/110,386

[22] Filed: Jul. 6, 1998

[51] Int. Cl.[7] .................................................... F16L 39/04
[52] U.S. Cl. ...................... 285/272; 285/282; 285/121.5; 285/190
[58] Field of Search ..................................... 285/190, 272, 285/121.6, 273, 282, 121.1, 121.3, 121.5

[56] References Cited

U.S. PATENT DOCUMENTS

| | | | |
|---|---|---|---|
| 1,788,500 | 1/1931 | Uhri, Jr. | 285/121.6 |
| 2,790,426 | 4/1957 | Mueller | 285/121.6 |
| 3,411,526 | 11/1968 | Schaefer | 285/273 |
| 3,917,322 | 11/1975 | Berg et al. | 285/282 |
| 4,239,262 | 12/1980 | Krupp et al. | 285/121.6 |
| 4,422,676 | 12/1983 | Sitabkhan | 285/190 |
| 4,998,693 | 3/1991 | Wiebe . | |
| 5,865,374 | 2/1999 | Barta et al. | 285/190 |

FOREIGN PATENT DOCUMENTS

| | | | |
|---|---|---|---|
| 478981 | 11/1951 | Canada | 285/190 |
| 918064 | 9/1954 | Germany | 285/190 |
| 1065745 | 9/1959 | Germany | 285/190 |
| 4-339792 | 11/1992 | Japan | 285/190 |

*Primary Examiner*—Eric K. Nicholson
*Attorney, Agent, or Firm*—Adrian D. Battison; Murray E. Thrift

[57] ABSTRACT

A swivel coupling for high pressure fluid of the type providing an axle through which fluid can pass to a rotary connector. The swivel coupling includes first and second mechanical bearings spaced apart and mounted along the axle, wherein each mechanical bearing has an inner and an outer bearing member. The inner bearing members are attached to the axle while a mounting member attaches to the outer bearings so that the bearings provide radial and axial support between the axle and the mounting member while allowing relative rotation between them. A fluid opening on the axle between the mechanical bearings communicates with the rotary connector. The rotary connector is supported by a pair of swivel bushings wherein each swivel bushing is mounted on an opposing end of the rotary connector for locating it between the mechanical bearings. High pressure seals are fitted into upper and lower annular recesses located on the axle in respective positions above and below the fluid opening for sealing the connector.

13 Claims, 3 Drawing Sheets

SWIVEL COUPLING FOR HIGH PRESSURE FLUID

FIELD OF THE INVENTION

This invention relates to a swivel coupling for high pressure fluid of the type providing an axle through which fluid can pass to a rotary coupling mounted on the axle for a relative rotation between the axle and the coupling while allowing high pressure fluid communication from the axle to the coupling.

BACKGROUND

One field where high pressure couplings are regularly required is in the field of spray washing systems in which high pressure fluid for high pressure spray nozzles is communicated from a stationary supply line to a rotary member. In some cases the rotary member carries a plurality of high pressure nozzles which are rotated around an axis to effect a washing action. In other cases, the rotary member is simply pulled from place to place so that it is necessary for rotation to occur around a mounting member so that for example a hand held wand can be moved to a number of different locations from a central stationary supply.

While the present invention is describe(d particularly in relation to washing systems of this type, the coupling described and claimed herein is not limited to such end uses.

One example of a rotary coupling for supplying fluid from a stationary supply to a rotatable boom is shown in U.S. Pat. No. 4,998,693 of the present inventor issued Mar. 12, 1991 wherein FIG. 5 there is shown a stationary axle having a high pressure water supply to one end of the axle. A first mechanical bearing supports the boom and hose for rotation about the axle. A second fluid coupling on one end of the mechanical bearing allows the supply of the high pressure fluid from the axle to a pipe which rotates around the axle. The second fluid coupling transfers fluid only and carries no loads.

This design has achieved some success when the fluid transfer swivel is not subjected to carrying a load, but is limited in the ability to properly supply the high pressure fluid to the hose. Particularly, the design has not adequately separated the fluid transfer and weight carrying components resulting in poor wear characteristics.

In most washing systems of the above general type, a rotating axle carries on one end a wand having a plurality of nozzles. The axle is driven by a pulley on an opposite end of the axle from the wand. The axle is mounted for rotation simply in the rotary high pressure coupling which therefore simultaneously provides both the mechanical support and the sealing relative to the axle of the high pressure fluid supply. This design has the advantage that it is relatively simple but is prone to early failure due to the fact that the mechanical forces from the pulley and the wand are applied in a radial direction to the seals thus leading to premature failure of the seals and early replacement.

It is one object of the present invention, therefore, to provide an improved rotary coupling for high pressure fluid which displays increased longevity and improved mechanical stability by separating the fluid transfer and the weight carrying components.

SUMMARY

According to one aspect of the invention there is provided an a swivel coupling for high pressure fluid comprising:

an axle having a first end and a second end and defining an axis of rotation longitudinal thereto;

a first fluid port at the first end of the axle;

a first and a second mechanical bearing mounted on the axle at spaced positions therealong, each bearing defining an inner bearing member fixed to the axle and an outer bearing member rotatable relative to the inner bearing member;

a mounting means attached to the outer bearing members so that the bearings provide mechanical support between the axle and the mounting means and allow relative rotation therebetween;

the axle having a fluid opening at a position thereon located between the mechanical bearings;

and a rotatable fluid connector mounted on the axle at the fluid opening and between the mechanical bearings for rotation relative to the axle independently of the mechanical bearings, the fluid connector being sealed by high pressure seals on opposite sides of the opening and providing a second fluid port;

whereby the mechanical bearings provide mechanical support for torque loads applied between the axle and the mounting means and the high pressure seals of the fluid connector are maintained substantially free from said torque loads.

Preferably the fluid connector has at each end a respective one of a pair of swivel bushings for supporting the connector for rotation on the axle and wherein each swivel bushing has an end face engaging a surface attached to a respective one of the mechanical bearings for axially locating the swivel coupling between the mechanical bearings.

Preferably the axle includes an upper and a lower annular recess in respective positions above and below the fluid opening wherein each recess locates a respective one of the high pressure seals.

Preferably the swivel coupling includes an annular recess along an inner surface of the respective outer bearing members forming a shoulder along the inner surface wherein the respective inner bearing member is received within the recess and engages the shoulder such that the mechanical bearings provide support for axial loads applied between the axle and the mounting means and the fluid connector is maintained substantially free from said axial loads.

In one embodiment it is preferred that the mounting means be in the form of a base plate mounting each of the outer bearing members of the respective first and second mechanical bearings to a fixed support. A boom having a plurality of nozzles is mounted to the first end of the axle and rotates with the axle for communicating fluid from the first fluid port to the nozzles. A supply hose is connected to the second port of the fluid connector and rotates with the fluid connector. A keyway is located on the second end of the axle for connecting to a drive pulley which rotates the axle.

In another embodiment of the invention it is preferred that the mounting means includes a pair of supporting plates, each mounted on a respective one of the mechanical bearings which provide support between the axle and the supporting plates and allow rotation of the plates about the axle, wherein the axle is mounted to a fixed support. A boom extends from the fluid connector and communicates with the second fluid port. The boom includes a hose and a plurality of nozzles and is mounted for rotation about the axle. A pair of spring arms is mounted on the supporting plates and supports the boom as it rotates about the axle, wherein the fluid connector is free from any loads applied to the boom. A supply hose is connected to the first end of the axle for communicating with the first port.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
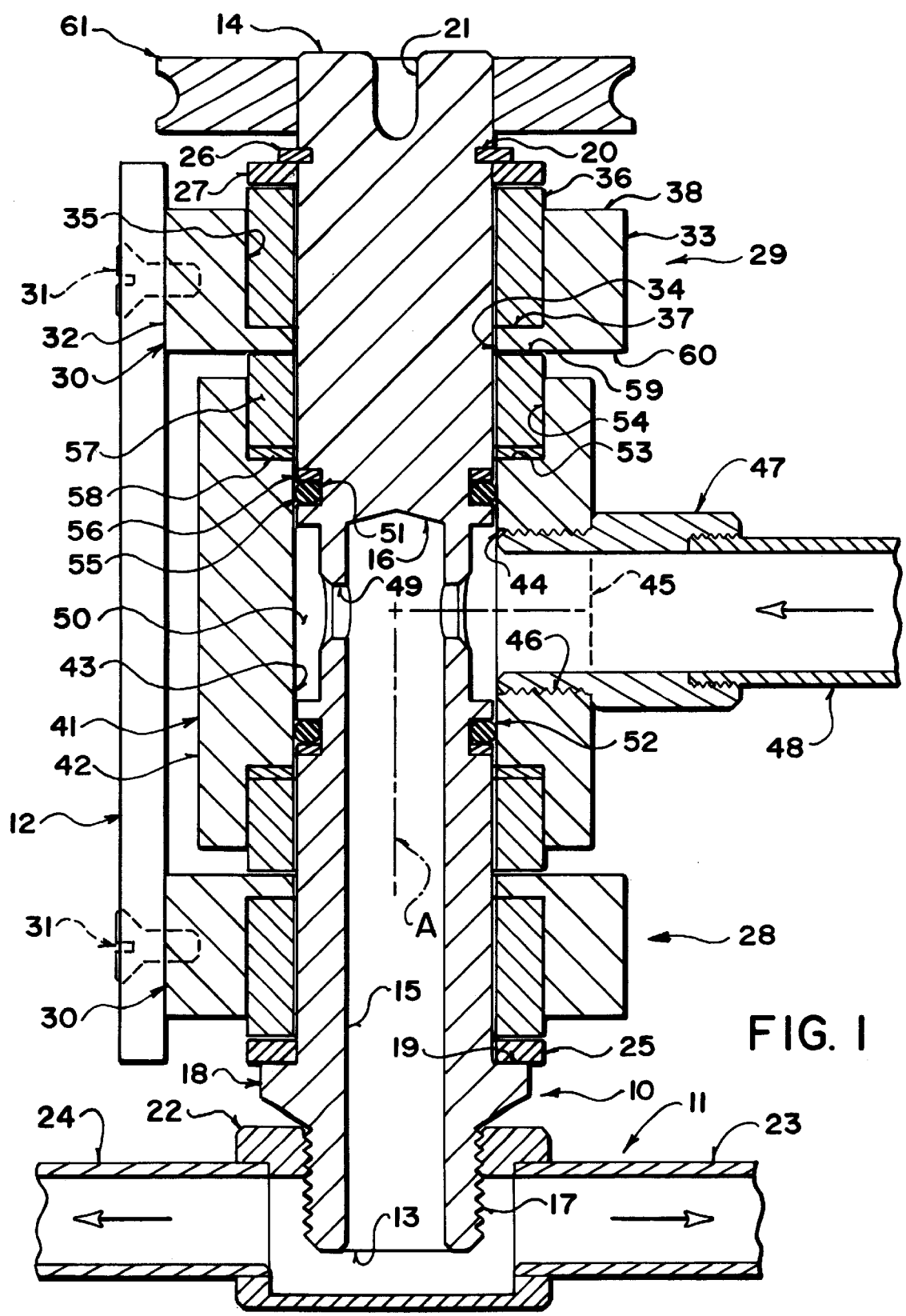
FIG. 1 is a longitudinal cross sectional view through a high pressure coupling according to the present invention in which the axle rotates relative to a stationary mount.

Turning firstly to the embodiment shown in FIG. 1, this provides an arrangement in which there is a rotating axle generally indicated at 10 carrying a wand 11 and rotatable relative to a fixed mounting base 12.

The axle 10 is machined from a metal rod so as to define a generally cylindrical outer surface extending from a first end 13 of the axle to a second end 14 of the axle. A bore 15 extends along the axle from the( end 13 to a blind end 16 of the bore partly along the axle and spaced from the end 14.

On the outside surface of the axle is machined a male thread 17 surrounding the axle at the end 13. Axially spaced from the thread 17 is provided an abutment shoulder 18 which stands radially outwardly from the thread and defines an end shoulder 19. From the shoulder 19, the outside surface of the axle is generally smooth and cylindrical through to the end 14 apart from an annular recess 20 adjacent the end 14 and apart from a keyway 21 at the end 14 and extending longitudinally of the axle over a short distance to recess 20. The threaded section 17 carries a coupling 22 of the wand 11 which is attached to the male thread by a female threaded section. The coupling 22 has a hollow interior to receive fluid from the bore 15 and to communicate that fluid through the coupling to a plurality of radially outwardly extending pipes 23 and 24 of the wand each of which carries one or more nozzles at its outer end so that as the axle rotates, the nozzles rotate around the axis of the axle and provide a conventional rotating washing action. The details of the coupling 22 are shown only schematically, since these are well known to one skilled in the art and can of course vary significantly depending upon requirements.

On the axle 10 at the shoulder 19 is applied an annular bearing retainer or washer 25 which butts against the shoulder 19 and defines an end surface for a mechanical bearing supporting the axle.

At the end 14 in the recess 20 is provided a snap ring 26 which snap fastens into the recess 20. The snap ring 26 locates a second bearing retainer or washer 27 identical to the retainer 25.

The bearing retainers 25 and 27 thus define end faces for a first mechanical bearing 28 and a second mechanical bearing 29 respectively.

Each mechanical bearing comprises a load frame end portion 30 which defines an end plate bolted to the mounting base 12 by machine screws 31. Thus the end plate 30 has an end surface 32 which is flat for resting against a flat surface of the base 12 and an arched portion 33 surrounding the axle 10. A bore 34 is formed in the arched section 33 through which the axle passes. A recessed counterbore 35 is recessed away from the outside surface of the axle for receiving an annular bearing member 36 surrounding the axle 10 and contacting the inside surface of the bore 35. The bearing 36 butts up against a shoulder 37 defined between the bores 34 and 35. An opposed end face, of the bearing 36 projects beyond a side surface 38 of the plate 30 so as to abut the retainer 27.

The annular bearing 36 is a commercially available type of bushing bearing which does not require lubrication. The bearing 36 is manufactured of a suitable polymer and remains stationary relative to the plate 30 so that the retaining washer 27 rotates with the axle relative to the end face of the bearing and the peripheral surface of the axle rotates relative to the inside surface of the bearing.

These surfaces therefore provide both radial and thrust bearings for the mechanical support of the axle for rotation of the axle relative to the mounting base 12. The bearings 28 and 29 thus carry the applied loads on the axle 10 from the weight of the wand 11 and the plurality of nozzles.

Between the mechanical bearings 28 and 29 is provided a fluid coupling 40. The fluid coupling 40 comprises an annular sleeve portion 41 with an outer surface 42 and an inner surface 43. A bore 44 is formed radially of the axis A of the axle so as to communicate from the inside surface 43 to a hole 45 in the outside surface 42. The bore 44 includes a female threaded section 46 into which is applied a plumbing connector 47 having a male thread for connecting to the female thread 46. A hose 48 communicates with the plumbing connector 47 so that a high pressure fluid can be supplied through the hose and passes through the bore 44 into the hollow interior between the surface 43 of the sleeve 41 and the outside surface of the axle 10. A plurality of holes 49 are formed radially of the axle so as to communicate from the bore 15 to a central annular recess 50 around the axle so that the fluid can pass from the annular recess 50 into the bore 15 for communication to the wand 11.

An upper annular recess 51 and a lower annular recess 52 are situated on the outer surface of the axle in respective positions above and below the central recess 50 used for sealing the fluid coupling.

It will be noted that the fluid coupling 40 is symmetrical about a centre plane containing the bores 49 and therefore the following description will relate only to one section of the sealing arrangement contained in the upper and lower annular recesses 51 and 52.

Thus within the annular recess 51 is provided a pressure seal 55. The seal 55 is a commercially available type such as the type manufactured by Parker.

Above the pressure seal 55 is provided a seal holder 56 which carries the pressure seal and is in effect part of the pressure seal and locates the pressure seal against the upper portion of the recess 51 so that pressure applied outwardly of the central plane of the fluid coupling 40 presses the pressure seal 55 against the bearing holder 56 and thus against the upper portion of the recess 51.

Above the recess 51 is provided a swivel bearing 57 which is carried on a bearing holder 58 and rests against a shoulder 53 defined between a bore 54 in the sleeve 41 and the inner surface 43 of the sleeve. An end face 59 of the swivel bearing 57 engages against a side face 60 of the end plate 30.

The swivel bearings 57 carry any loads applied between the fluid coupling 40 and the axle 10 in order to protect the pressure seals 55. The bearings 57 are again of a conventional type commercially available by various manufacturers.

The swivel coupling including the sleeve 41 is thus free to rotate relative to the axle, the axle being held stationary in one embodiment of the invention. In another embodiment the axle rotates within the sleeve as the sleeve is held stationary by the hose 48.

The pressure seals 55 act to prevent the axial escape of the high pressure fluid from the chamber 50. The bearings 57 do not provide any mechanical support for the axle relative to the base 12 but instead simply provide mechanical support for the coupling 40 and particularly the sleeve 41 relative to the axle. While the mechanical pressure from the axle to the base may therefore be relatively high, the mechanical force through the bearings 57 is very low. The bearings 57 however provide the mechanical support for the coupling 40 and its hose 48 in a radial direction and also the engagement of the end faces of the bearings with the end face 60 of the end plate 30 provides axial thrust support. The coupling 40 is thus located between the mechanical bearings 28 and 29 and is held in place by those bearings.

As the radial loading on the bearings 57 is very low, these bearings have little wear and therefore avoid distortion of the pressure seals which could rapidly cause leaking.

In the embodiment shown in FIG. 1, the end plates 30 are held fixed on the base 12 and the axle is free to rotate. This allows the wand 11 to be driven by a pulley 61 carried on the keyway 21 at the end 14 of the axle. The significant loading from the pulley and from the wand is therefore applied to the axle and through the axle to the mechanical bearings 36 rather than to the swivel coupling 40.

Figure 2:
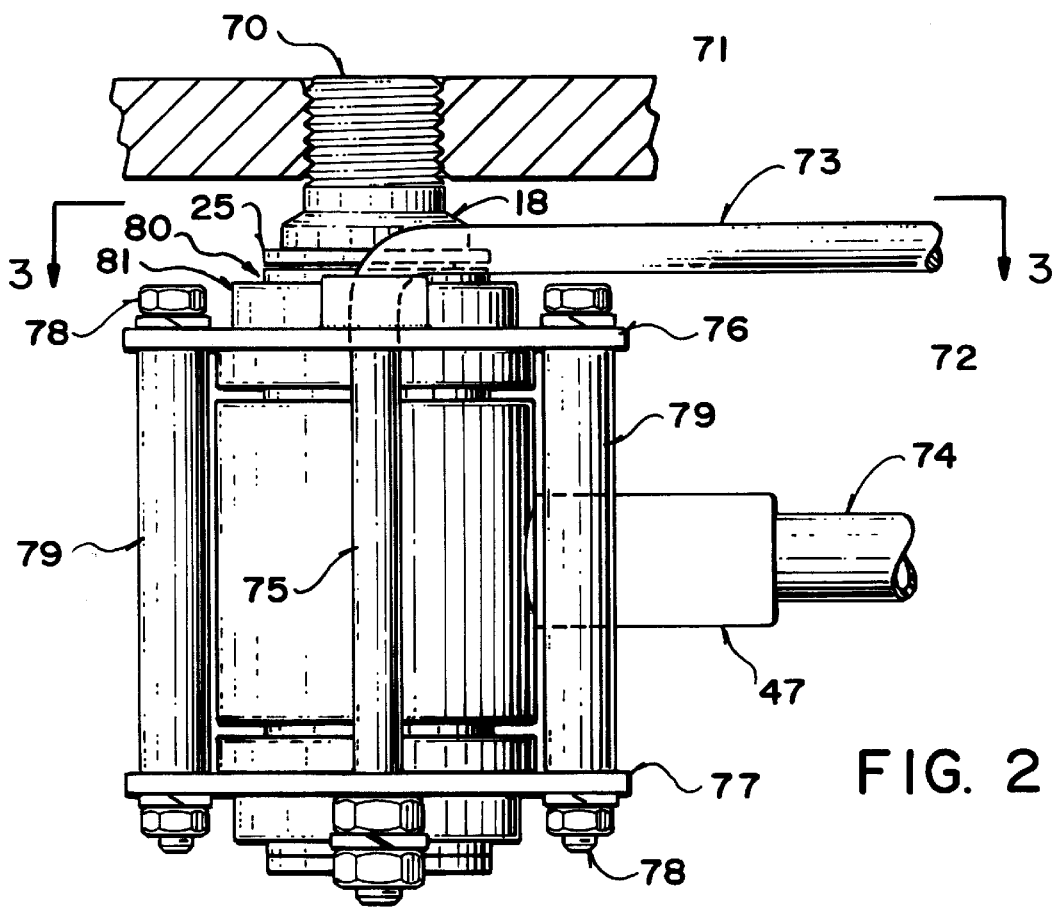
FIG. 2 is a side elevational view of a second coupling according to the present invention in which the axle is stationary and supports a rotary boom.
Figure 3:
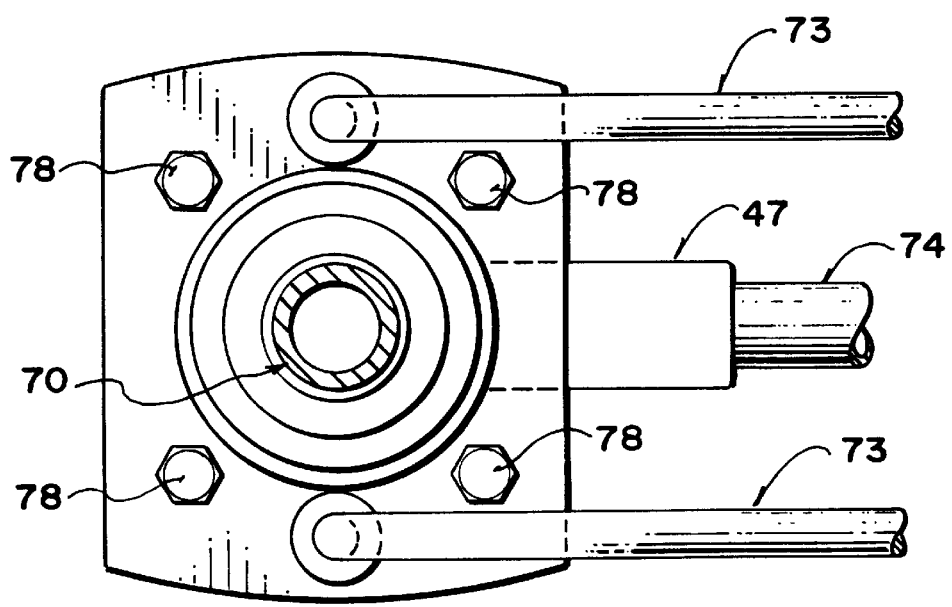
FIG. 3 is a cross sectional view along the lines 3—3 of FIG. 2.
Figure 4:
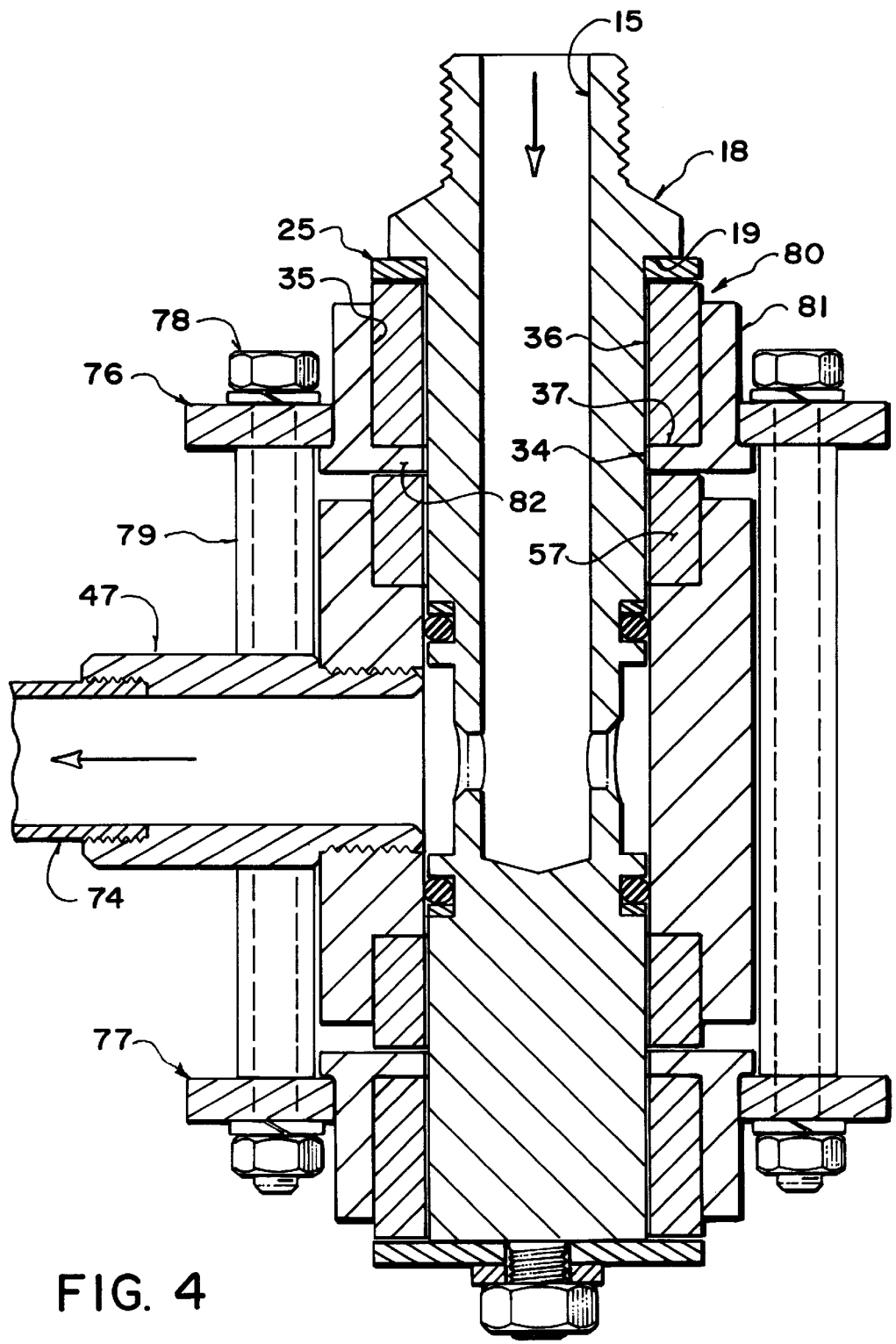
FIG. 4 is a vertical cross sectional view through the coupling of FIGS. 2 and 3.

Turning now to the embodiment shown in FIGS. 2, 3 and 4, this is somewhat similar to that shown in FIG. 5 of U.S. Pat. No. 4,998,693 mentioned above. It will be noted therefore that the embodiment includes a fixed axle 70 which is attached to a suitable horizontal support 71 so that the axle is held vertical. A boom arm generally indicated at 72 includes a pair of boom support springs 73 and a supply hose 74. The arrangement of the boom is shown only partly since its complete construction is shown in more detail in FIGS. 1 through 4 of the above patent.

Each of the springs 73 includes a vertical down turned portion 75 which extends through an upper support plate 76 and a bottom support plate 77. These plates are bolted together by four bolts 78 mounted within spacer sleeves 79 so that the plates 76 and 77 form a rigid coupled structure to which the vertical section 75 of the springs 73 is attached.

The mounting arrangement supporting the plates 76 and 77 on the axle is substantially identical to that previously described and utilizes substantially the same components so the same reference numerals are shown in the cross section of FIG. 4. Thus the swivel coupling 40 substantially as previously described is mounted on the axle and is connected to the plumbing connector 47 receiving the hose 74. It will be appreciated however that in this arrangement the axle is stationary and therefore the high pressure fluid is supplied through the open upper end of the axle and exits through the plumbing connector 47 to the hose 74.

In addition the mechanical support for the plate 76 and 77 is substantially identical to the mechanical bearing arrangement as previously described. In this arrangement, however, the plates 76 and 77 simply comprise flat plates and are attached to additional elements 80. These elements comprise a cylindrical sleeve portion 81 defining the inner surface 35 and a radially inwardly extending portion 82 defining the inner surface 34 and the shoulder 37. Instead of the machine end plates 30, therefore, the end plates of the embodiment of FIG. 4 are fabricated from the flat plate 76 and the additional piece 80. However the elements operate in the same manner as in the previous embodiment to provide the mechanical support between the axle and the end plate 76.

While the present invention is described particularly in relation to washing systems of this type, the coupling described and claimed herein is not limited to such end uses.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A swivel coupling for high pressure fluid comprising:
   an axle having a first end and a second end and defining an axis of rotation longitudinal thereto;
   a first fluid port at the first end of the axle;
   a first and a second mechanical bearing mounted on the axle at spaced positions therealong, each bearing defining an inner bearing member fixed to the axle and an outer bearing member rotatable relative to the inner bearing member;
   a mounting means attached to the outer bearing members so that the bearings provide mechanical support between the axle and the mounting means and allow relative rotation therebetween;
   the axle having a fluid opening at a position thereon located between the mechanical bearings;
   a rotatable fluid connector mounted on the axle at the fluid opening and between the mechanical bearings for rotation relative to the axle, the fluid connector being sealed by high pressure seals on opposite sides of the opening and providing a second fluid port; and
   a boom having a plurality of nozzles mounted to the first end of the axle and being arranged to rotate with the axle for communicating fluid from the first fluid port to the nozzles;
   whereby the mechanical bearings provide mechanical support for torque loads applied between the axle and the mounting means and the high pressure seals of the fluid connector are maintained substantially free from said torque loads.

2. The swivel coupling according to claim 1 wherein the fluid connector has at each end a respective one of a pair of swivel bushings for supporting the connector for rotation on the axle and wherein each swivel bushing has an end face engaging a surface attached to a respective one of the mechanical bearings for axially locating the swivel coupling between the mechanical bearings.

3. The swivel coupling according to claim 1 wherein the axle includes an upper and a lower annular recess in respective positions above and below the fluid opening wherein each recess locates a respective one of the high pressure seals.

4. The swivel coupling according to claim 1 including an annular recess along an inner surface of the respective outer bearing members forming a shoulder along the inner surface wherein the respective inner bearing member is received within the recess and engages the shoulder such that the mechanical bearings provide support for axial loads applied between the axle and the mounting means and the fluid connector is maintained substantially free from said axial loads.

5. The swivel coupling according to claim 1 wherein the mounting means is in the form of a base plate mounting each of the outer bearing members of the respective first and second mechanical bearings to a fixed support.

6. The swivel coupling according to claim 5 including a supply hose connected to the second port of the fluid connector, the hose rotating with the fluid connector.

7. The swivel coupling according to claim 5 including a keyway on the second end of the axle for connecting to a drive pulley which rotates the axle.

8. A swivel coupling for high pressure fluid comprising:

an axle having a first end and a second end and defining an axis of rotation longitudinal thereto;

a fixed support mounting the axle thereon;

a first fluid port at the first end of the axle;

a first and a second mechanical bearing mounted on the axle at spaced positions therealong, each bearing defining an inner bearing member fixed to the axle and an outer bearing member rotatable relative to the inner bearing member;

a fluid delivery means for communicating high pressure fluid therethrough;

a mounting means attached to the outer bearing members and arranged to support the fluid delivery means thereon so that the bearings provide mechanical support between the axle and the mounting means and allow relative rotation therebetween;

the axle having a fluid opening at a position thereon located between the mechanical bearings;

a rotatable fluid connector mounted on the axle at the fluid opening and between the mechanical bearings for rotation relative to the axle, the fluid connector being sealed by high pressure seals on opposite sides of the opening and providing a second fluid port for communication with the fluid delivery line;

whereby the mechanical bearings provide mechanical support for torque loads applied between the axle and the mounting means and the high pressure seals of the fluid connector are maintained substantially free from said torque loads.

9. The swivel coupling of claim 8 wherein the fluid delivery means comprises a boom extending from the fluid connector and communicating with the second fluid port, the boom including a hose and a plurality of nozzles and being mounted for rotation about the axle.

10. The swivel coupling of claim 8 including a supply hose connected to the first end of the axle for communicating with the first port.

11. The swivel coupling according to claim 9 wherein the mounting means includes a pair of supporting plates mounting the boom thereon, each supporting plate being mounted on a respective one of the mechanical bearings which provide support between the axle and the supporting plates and allow rotation of the plates about the axle.

12. The swivel coupling of claim 11 including a pair of spring arms mounted on the supporting plates and supporting the boom as it rotates about the axle, wherein the fluid connector is free from any loads applied to the boom.

13. A swivel coupling for high pressure fluid comprising:

an axle having a first end and a second end and defining an axis of rotation longitudinal thereto;

a first fluid port at the first end of the axle;

a first pair of mechanical bearings mounted on the axle at spaced positions therealong, each bearing of the first pair of mechanical bearings defining an inner bearing member fixed to the axle and an outer bearing member rotatable relative to the inner bearing member;

a mounting means attached to the outer bearing members so that the first pair of mechanical bearings provide mechanical support between the axle and the mounting means and allow relative rotation therebetween;

a fluid opening in the axle at a position thereon located between the first pair of mechanical bearings;

a rotatable fluid connector mounted at the fluid opening, the fluid connector being sealed by high pressure seals on opposite sides of the opening and providing a second fluid port;

a second pair of mechanical bearings mounting the rotatable fluid connector on the axle such that the fluid connector is rotatable about the axle relative to the mounting means and independently of the first pair of mechanical bearings, the second pair of mechanical bearings being mounted at spaced locations along the axle between the first pair of mechanical bearings on opposite sides of the fluid opening;

each bearing of the second pair of mechanical bearings defining an end face arranged to engage the mounting means to axially locate the fluid connector between the first pair of mechanical bearings while providing mechanical support to the fluid connector;

whereby the first pair mechanical bearings provide mechanical support for torque loads applied between the axle and the mounting means and the high pressure seals of the fluid connector are maintained substantially free from said torque loads.

* * * * *